(12) United States Patent
Ueland et al.

(10) Patent No.: US 7,363,989 B2
(45) Date of Patent: Apr. 29, 2008

(54) DEVICE FOR A PULLING TOOL FOR USE IN PIPES AND BOREHOLES FOR THE PRODUCTION OF OIL AND GAS

(75) Inventors: Geir Ueland, Sola (NO); Jone Mellemstrand, Voll (NO)

(73) Assignee: Chain Train (NO)

( * ) Notice: Subject to any disclaimer, the term of this patent is extended or adjusted under 35 U.S.C. 154(b) by 97 days.

(21) Appl. No.: 10/541,110

(22) PCT Filed: Jan. 26, 2004

(86) PCT No.: PCT/NO2004/000022

§ 371 (c)(1),
(2), (4) Date: Mar. 17, 2006

(87) PCT Pub. No.: WO2005/071216

PCT Pub. Date: Apr. 8, 2005

(65) Prior Publication Data

US 2007/0012485 A1    Jan. 18, 2007

(51) Int. Cl.
*E21B 7/04* (2006.01)
(52) U.S. Cl. .................. 175/51; 175/90; 175/106
(58) Field of Classification Search .............. 175/89, 175/90, 106, 51; 166/237
See application file for complete search history.

(56) References Cited

U.S. PATENT DOCUMENTS

| | | | |
|---|---|---|---|
| 2,742,259 A | 4/1956 | Boucher | |
| 3,125,464 A * | 3/1964 | Harmes | 118/105 |
| 4,085,808 A | 4/1978 | Kling | |
| 4,112,850 A | 9/1978 | Sigel-Gfeller | |
| 4,192,380 A * | 3/1980 | Smith | 166/254.2 |
| 4,670,862 A | 6/1987 | Staron et al. | |
| 4,770,105 A | 9/1988 | Takagi et al. | |
| 6,227,313 B1 | 5/2001 | Davis et al. | |
| 6,910,533 B2 * | 6/2005 | Guerrero | 166/206 |
| 7,150,318 B2 * | 12/2006 | Freeman | 166/255.1 |
| 7,156,192 B2 * | 1/2007 | Guerrero et al. | 175/51 |

FOREIGN PATENT DOCUMENTS

| | | |
|---|---|---|
| GB | 109021 | 8/1917 |
| GB | 2362405 A | 11/2001 |

* cited by examiner

*Primary Examiner*—David J. Bagnell
*Assistant Examiner*—David Andrews
(74) *Attorney, Agent, or Firm*—Andrus, Sceales, Starke & Sawall, LLP

(57) ABSTRACT

A pulling tool for use in the placing of equipment and acquisition of data from pipes and boreholes used in the production of oil and gas. For this purpose the tool is constructed round a central, elongate, cylindrical main element (1) to which there are arranged radially movable links (2), (4) and (5) with chains (3) arranged thereto, running in grooves (11). Radial movement of the links is provided by subjecting a terminal element (9) for the links (5) to an axial movement by means of an actuator (24). The chains (3) are rotated by an electric motor (8) transferring, through the axle (9) connected to the bevel gears (18) and (17), propulsive force to the chain wheel (15) on which the chains (3) are running.

8 Claims, 5 Drawing Sheets

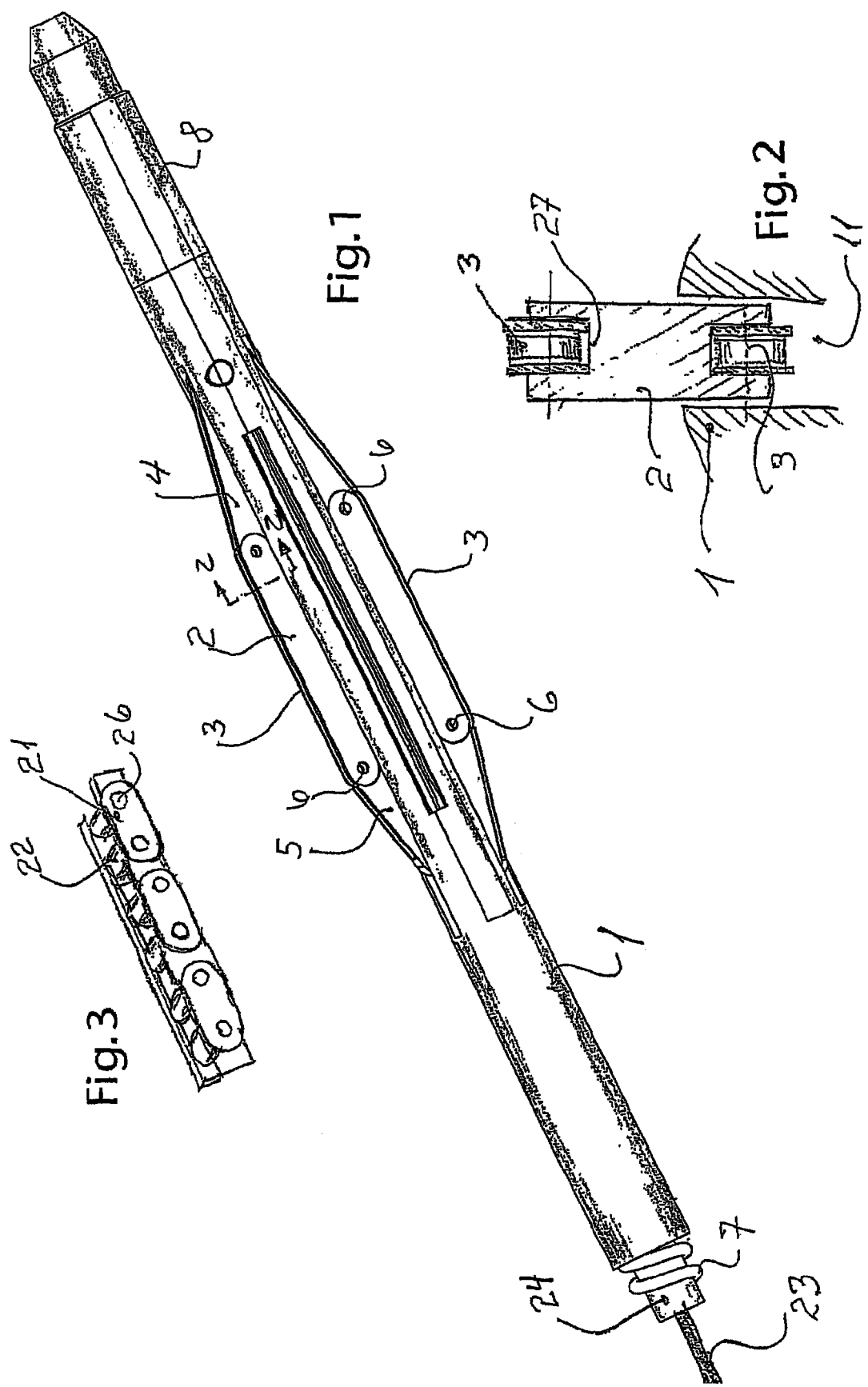

DEVICE FOR A PULLING TOOL FOR USE IN PIPES AND BOREHOLES FOR THE PRODUCTION OF OIL AND GAS

CROSS REFERENCE TO RELATED APPLICATION

The present application is the U.S. national stage application of International Application PCT/NO2004/000022, filed Jan. 26, 2004.

BACKGROUND AND SUMMARY OF THE INVENTION

This invention relates to a pulling tool, in particular for use in the positioning of equipment and acquisition of measured data in pipelines and boreholes for the production of oil and gas.

In long pipelines and boreholes there is often a need for putting down different equipment and collect measured data. For this purpose pulling tools of different embodiments are used, having wheels or chains that roll on the wall of the pipe or borehole. The rollers or the chain are/is pressed against the wall of the pipe/borehole with a force sufficient to achieve the desired axial propulsive force in varying frictional conditions. The supply of power is effected through a cable connection to the surface.

An optimum pulling tool must be formed to be able to negotiate restrictions and sharp curvatures without getting stuck. In order to achieve these important functions, a solution has been reached in the present invention, which makes it possible in a simple and robust way to meet these functional requirements. To achieve this object the pulling tool is provided with 3 axially longitudinal chains, offset 120 degrees relative to each other viewed in a section perpendicular to the longitudinal axis. The chains run on longitudinal links which are interlocked, so that the radial movement will be the same for all three chains when they are moved radially. With this construction is achieved that the pulling tool is always kept centred within a pipe or a borehole. This is a condition for allowing efficient positioning of equipment and operation of measuring tools.

A limitation in the length of the tool is achieved by all three links with chains being arranged in such a way that they have a radial movement out from the centre. In addition, the links are arranged 120 degrees offset relative to each other and with the same extent longitudinally. In most other known structures the pulling devices are arranged one behind the other, which makes the pulling tool long and unsuitable in sharp curvatures. In boreholes which have not been lined with steel pipes, the walls are often rough and it is difficult for wheels to achieve sufficient grip. In such events the use of chains would be advantageous.

Most known pulling tools utilize electric/hydraulic operation. This means that an electric motor drives a hydraulic pump, which again supplies power to hydraulic motors in the driving wheels. Such a system will be technically complex and low efficiency is achieved. With a limited supply of power through long cables, this will limit the traction substantially. In several operations great tractive power is desirable. In the present invention propulsion is effected through direct electric drive, without the use of hydraulics. Thereby a substantially higher performance is achieved for the pulling tool.

BRIEF DESCRIPTION OF THE DRAWINGS

The invention will now be explained in further detail in connection with a description of an exemplary embodiment and with reference to drawings, in which:

FIG. 1 shows the pulling tool with chains and links in the extended position;
FIG. 2 shows section 2-2 through a link with chain guides;
FIG. 3 shows a chain detail.

DETAILED DESCRIPTION OF THE INVENTION

Figure 4:
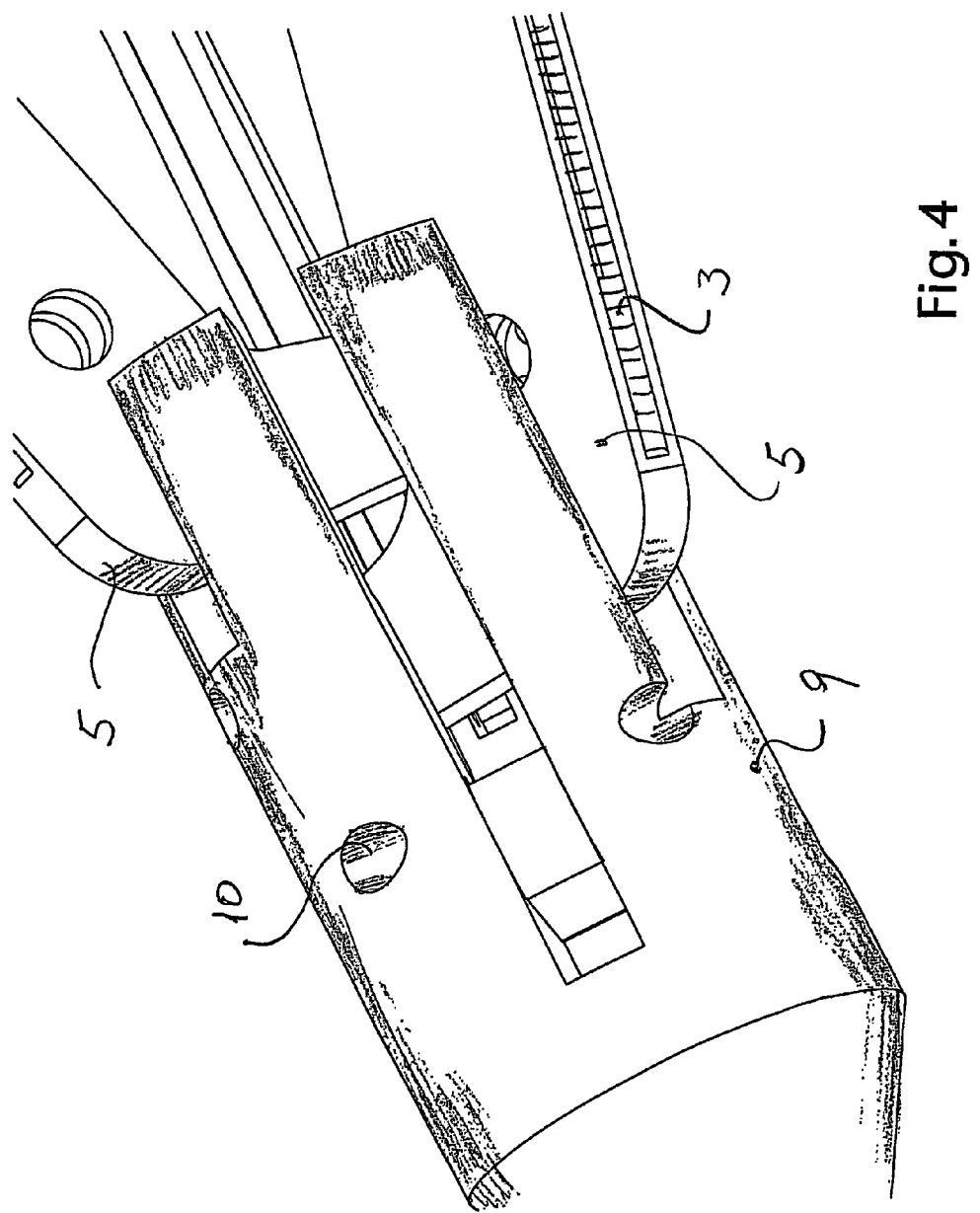
FIG. 4 shows the mounting of links.
Figure 5:
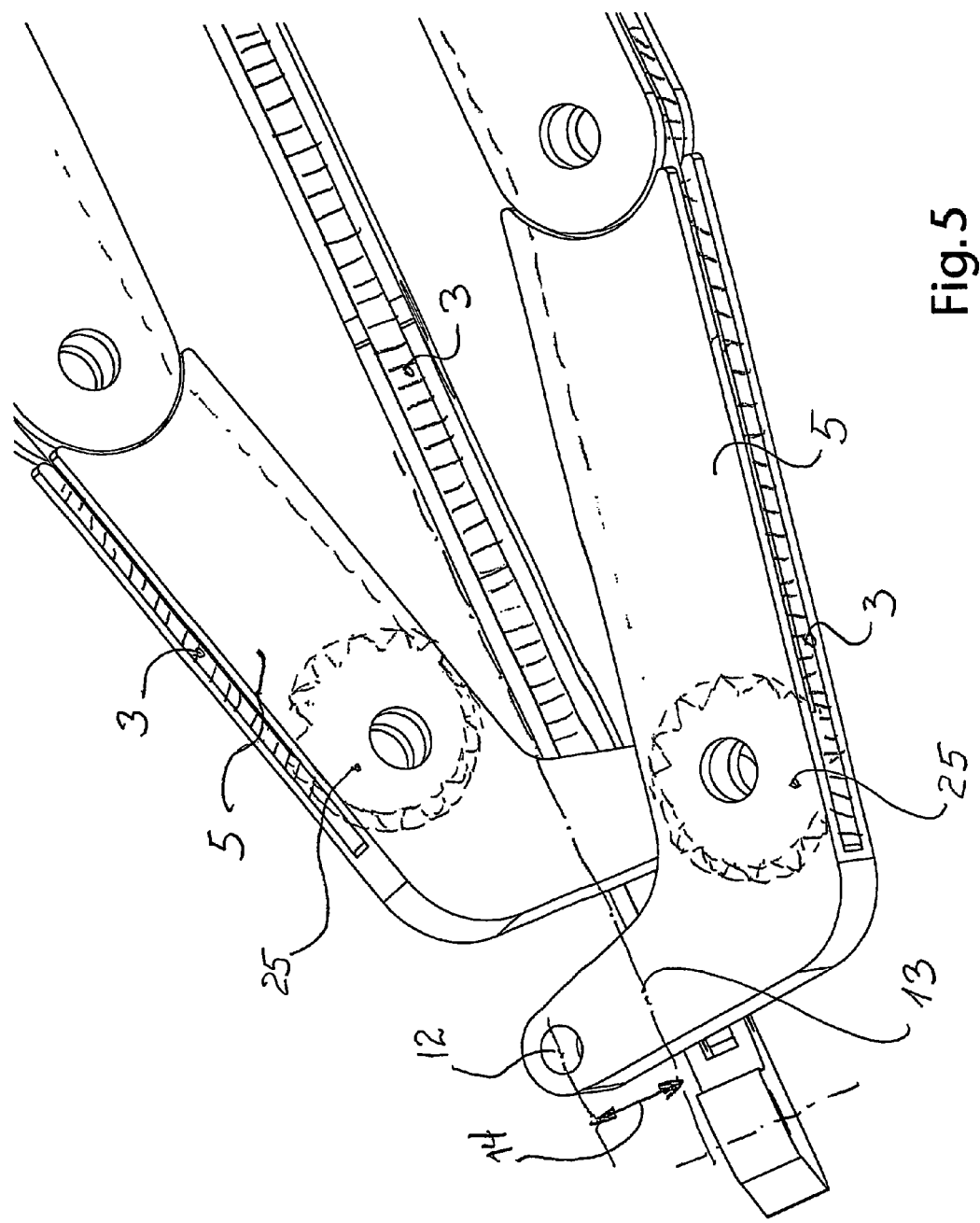
FIG. 5 shows a detail of the mounting for links.
Figure 6:
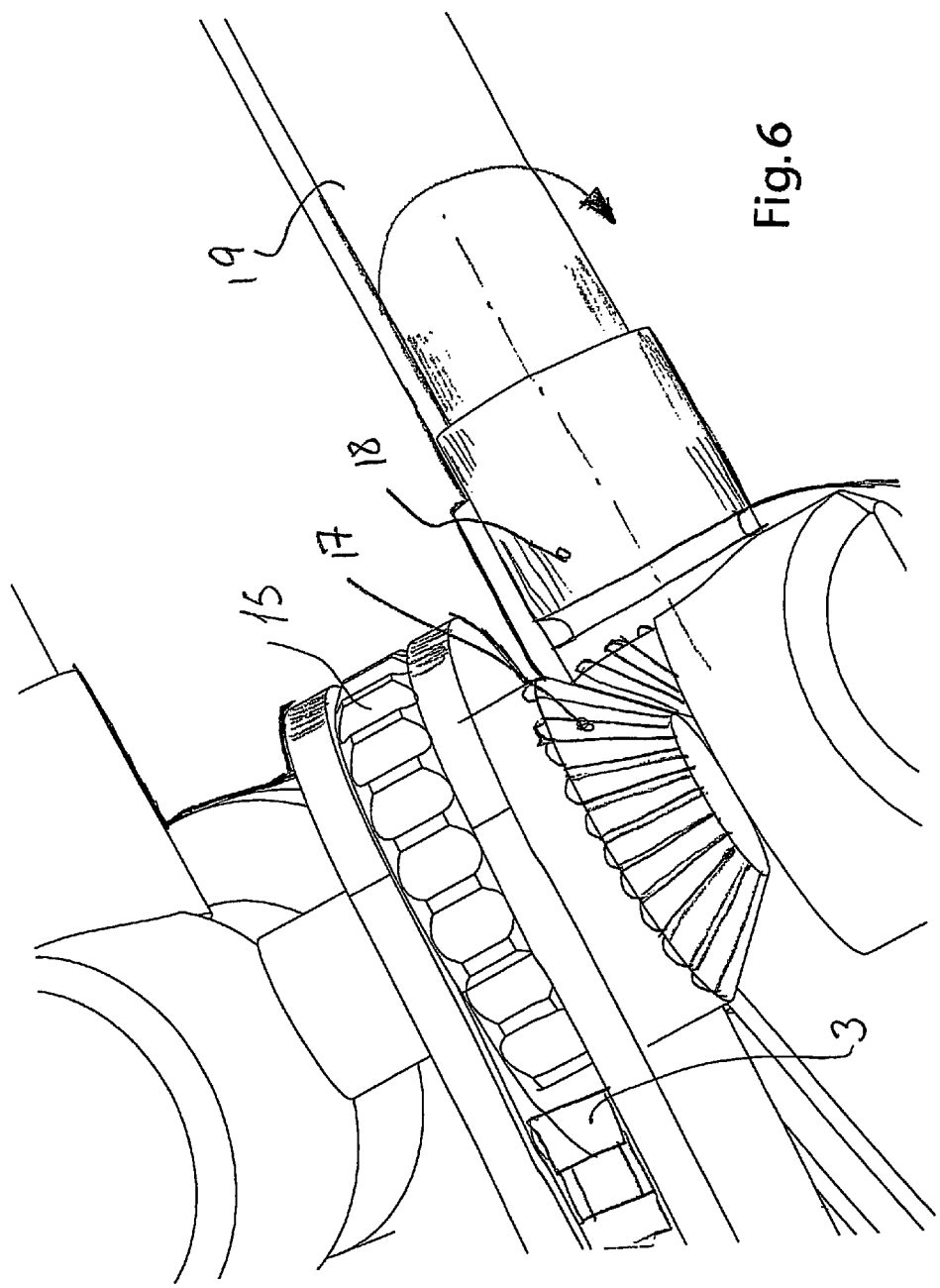
FIG. 6 shows a detail of a drive arrangement for chains.
Figure 7:
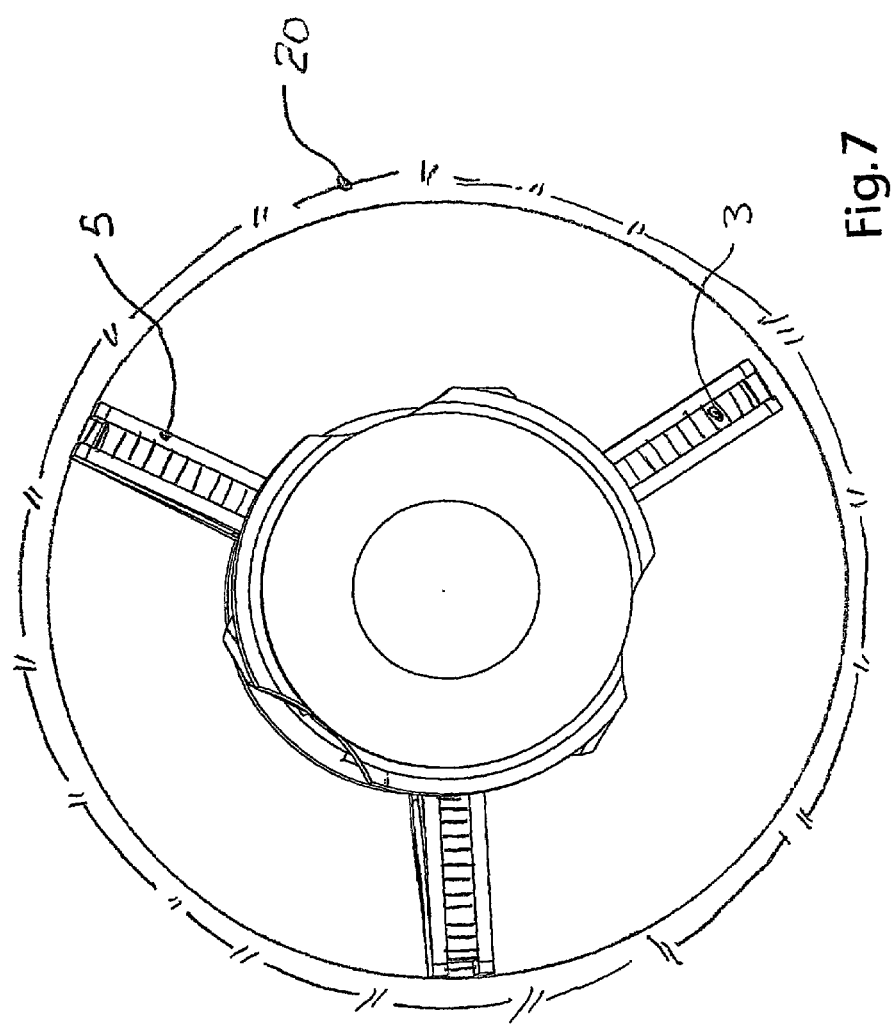
FIG. 7 shows a section of a borehole with the pulling tool in an extended position against the wall of the borehole.

The main structure of the tool consists of an elongate, cylindrical element (1). To this cylindrical element are arranged links (2), (4) and (5) connected with linkages (6). The links can be moved radially in milled grooves (11) in the main element (1) in such a way that the links (2) are forced against the borehole wall (20) in a position parallel to the longitudinal axis of the main part (1). Radial displacement of the links (2) is brought about by the terminal element (9), to which the links (5) are connected, being moved axially. To obtain the greatest possible radial force against the borehole wall, the links (5) are terminated at the terminal element (9) through the bolt (12) in a bolt hole (10) at a distance (14) on the opposite side of the centre line (13). A corresponding termination is made for all three end links (5) placed 120 degrees offset from each other. Axial movement for the activation of the links (5) through the terminal element (9) is effected by an actuator (24) and a spring element (7) placed between the actuator and the terminal element (9). The supply of energy to the actuator and the driving of the chains (3) is effected through a cable connection (23) from the surface.

The chain (3) is made up of side links (21) with rollers (22) held in place by through bolts (26). The chain runs in milled grooves (27) in the links and across pulleys (25) and driving wheels (15).

The driving of the chains (3) is provided by three chain wheels (15) arranged to a bevel gear (17) engaging the bevel gear (18) connected to the shaft (19). The shaft (19) communicates with the electric motor (8), so that the electric motor is mechanically connected to the chain wheel (15) for direct mechanical drive of the chains (3).

The invention claimed is:

1. A pulling tool for use in pipelines and boreholes, the pulling tool comprising:
    a body that is elongated along a central longitudinal axis;
    a terminal element that is displaceable in a direction that is parallel to the central longitudinal axis;
    at least one link arrangement being displaceable in a radial direction with respect to the central longitudinal axis, the link arrangement comprising first, second and third elongated links, the second link hingedly connecting one end of the first link to the elongated body and the third link hingedly connecting the other end of the first link to the terminal element;
    a hinge pin connecting the third link to the terminal element, the hinge pin located on the opposite side of the central longitudinal axis relative to the first link;
    wherein displacement of the terminal element in the direction parallel to the central longitudinal axis causes displacement of the link arrangement in the radial direction with respect to the central longitudinal axis.

2. The pulling tool of claim 1, having exactly three link arrangements offset relative to each other around the body at 120 degree intervals.

3. The pulling tool of claim 1, comprising a preloaded spring element connected to the terminal element and operable to bias the first link radially outwardly.

4. The pulling tool of claim 3, comprising an actuator driving the spring element.

5. The pulling tool of claim 4, comprising an electric motor enabling mechanical drive of the propulsion chain.

6. The pulling tool of claim 5, wherein the mechanical drive of the chain is enabled by at least one chain wheel.

7. The pulling tool of claim 1, comprising a propulsion chain riding along at least the first link.

8. The pulling tool of claim 7, wherein a supply of energy to the electric motor is provided by a cable connection.

* * * * *